US011403422B2

(12) United States Patent
Edwards et al.

(10) Patent No.: US 11,403,422 B2
(45) Date of Patent: *Aug. 2, 2022

(54) SYSTEMS AND METHODS FOR THE SECURED ENTRY AND STORAGE OF SENSITIVE DATA

(71) Applicant: Capital One Services, LLC, McLean, VA (US)

(72) Inventors: Joshua Edwards, Philadelphia, PA (US); Salik Shah, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,694

(22) Filed: Nov. 23, 2020

(65) Prior Publication Data

US 2021/0103677 A1 Apr. 8, 2021

Related U.S. Application Data

(63) Continuation of application No. 16/673,147, filed on Nov. 4, 2019, now Pat. No. 10,846,427, which is a continuation of application No. 16/196,445, filed on Nov. 20, 2018, now Pat. No. 10,474,838.

(51) Int. Cl.
*G06F 21/62* (2013.01)
*H04L 9/40* (2022.01)

(52) U.S. Cl.
CPC .......... *G06F 21/6245* (2013.01); *H04L 63/12* (2013.01); *G06F 21/6263* (2013.01); *G06F 2221/2107* (2013.01)

(58) Field of Classification Search
CPC .................................................. G06F 21/6245
See application file for complete search history.

(56) References Cited

U.S. PATENT DOCUMENTS 5,153,918 A * 10/1992 Tuai .......................... G06F 3/16
713/182
5,311,596 A * 5/1994 Scott ....................... G06F 21/31
380/266
5,699,513 A * 12/1997 Feigen .................... G06F 21/31
726/11

(Continued)

*Primary Examiner* — William S Powers
(74) *Attorney, Agent, or Firm* — DLA Piper LLP US

(57) ABSTRACT

Embodiments of the present disclosure include systems and methods for securely entering, receiving, and storing sensitive data. A server system may determine if a request received from a user computing device communicatively coupled to the server triggers a requirement to receive sensitive data from the user computing device, generate a data structure for the sensitive data, designate a plurality of contact methods, determine a communication protocol for each of the designated plurality of contact methods, transmit a request for data unit information to the corresponding designated contact methods via the determined communication protocol for each data unit of the data structure, receive from each of the designated contact methods, the data unit information corresponding to the respective single data unit, and generate sensitive data by aggregating the received data unit information received from each of the designated contact methods.

20 Claims, 5 Drawing Sheets

(56) References Cited

U.S. PATENT DOCUMENTS

| | | | | |
|---|---|---|---|---|
| 5,736,932 | A * | 4/1998 | Bulfer | H04L 63/0853 |
| | | | | 340/5.74 |
| 5,901,284 | A * | 5/1999 | Hamdy-Swink | H04L 29/06 |
| | | | | 340/5.74 |
| 6,012,144 | A * | 1/2000 | Pickett | G06Q 20/04 |
| | | | | 380/33 |
| 6,219,793 | B1 * | 4/2001 | Li | B60R 25/2018 |
| | | | | 726/19 |
| 6,907,034 | B1 * | 6/2005 | Begis | H04L 63/0428 |
| | | | | 370/352 |
| 7,870,599 | B2 * | 1/2011 | Pemmaraju | G06F 21/32 |
| | | | | 726/2 |
| 8,150,037 | B2 * | 4/2012 | Luk | H04L 9/083 |
| | | | | 324/228 |
| 2006/0165092 | A1 * | 7/2006 | Wilson | H04M 3/42263 |
| | | | | 370/395.21 |
| 2008/0298587 | A1 * | 12/2008 | Luk | H04L 9/083 |
| | | | | 380/255 |

* cited by examiner

SYSTEMS AND METHODS FOR THE SECURED ENTRY AND STORAGE OF SENSITIVE DATA

CROSS-REFERENCE TO RELATED APPLICATIONS

This is a continuation of U.S. application Ser. No. 16/673,147, filed Nov. 4, 2019, which is a continuation of U.S. application Ser. No. 16/196,445 filed Nov. 20, 2018, now U.S. Pat. No. 10,474,838, issued Nov. 12, 2019, the contents of which are hereby incorporated by reference in their entirety.

TECHNICAL FIELD

The present disclosure is directed towards systems and methods for securely entering, receiving, and storing sensitive data.

BACKGROUND

Sensitive data such as personally identifying information, health data, financial data, employment data, and the like are often transmitted electronically over networks. However, conventional networks for sharing sensitive data such as social security numbers, are vulnerable to security attacks, such as man-in-the-middle attacks. In man-in-the-middle attacks, an attacker may obtain the sensitive data being transmitted between the two parties, while at the same time secretly relaying (and possibly altering) the transmitted sensitive data, without either of the two parties being aware of the attack.

Further, conventional systems are vulnerable to security attacks because in conventional systems sensitive data is often stored in a central location. It is possible that although information is transmitted and stored in an encrypted format, as the computational power of computers increases, the ability to decrypt the information stored in the central location will also increase.

SUMMARY

As discussed above, conventional systems for entering, transmitting, and storing sensitive data such as personally identifying information, health data, financial data and the like, are vulnerable to attackers who may intercept a transmission, or be able to decrypt a transmission. Further, conventional systems are also vulnerable to attackers who may be able to decrypt encrypted information stored at a centralized point.

Accordingly, there is a need for improved systems and methods for entering, transmitting, and storing sensitive data in a way that addresses the problems discussed above.

To that end, some embodiments of the present disclosure are generally directed towards systems and methods for securely entering, receiving, and storing sensitive data. To address the technical problems discussed above, in some embodiments, the disclosed solutions are able to enter, receive, and store sensitive data using a distributed architecture, where there is no longer a single point of failure. In some embodiments, the distributed architecture is facilitated thru the use of multiple contact methods each using distinct and often independent communication protocols to provide a portion of the sensitive data. Further, the described systems provide a distributed computer-system based architecture for storing the sensitive data.

For example, in some embodiments, the described systems and methods may allow a person to enter sensitive data (e.g., social security number) on a web based application using multiple contact methods and modes of communication (e.g., a text message from a cell phone for the first 3 digits, an email for the middle 2 digits, and a direct message using a social media application for the last 4 digits). Accordingly, an attacker is unable to determine the person's social security number by intercepting the conversation because the conversation holds only a portion of the entire sensitive data. Further, if the three portions of the social security number are stored separately, an attacker would face additional difficulties in being able to decrypt a stored social security number.

The disclosed systems and methods may provide many benefits to the end user, whose sensitive data will no longer have a single point of failure.

In some embodiments, an improved system for secured entry and storage of sensitive data includes a server communicatively coupled to a user device by a network, wherein the server comprises a non-transitory memory storing computer-readable instructions and a processor. The execution of the computer-readable instructions may cause the server to determine if a request received from a user computing device communicatively coupled to the server triggers a requirement to receive sensitive data from the user computing device, generate a data structure for the sensitive data responsive to the requirement being triggered, wherein the data structure comprises a plurality of data units, designate a plurality of contact methods based on contact data stored on a database communicatively coupled to the server, wherein each of the plurality of contact methods is configured to provide data unit information corresponding to a single data unit from among the generated plurality of data units, determine a communication protocol for each of the designated plurality of contact methods, transmit, for each of the plurality of data units, a request for data unit information to the corresponding designated contact via the determined communication protocol, receive from each of the designated contacts, the data unit information corresponding to the respective single data unit, and generate sensitive data by aggregating the received data unit information received from each of the designated contacts.

Further, the system may be configured such that the plurality of requests for data unit information are transmitted concurrently and/or consecutively in accordance with the communication protocol. Further, the server may be configured to store at least one of the received data unit information or generated sensitive data in the database in an encrypted format. Further, the database may be configured to store the received data unit information corresponding to the plurality of data units in separate data structures. Still further, the computing device may be communicatively coupled to the server and including at least one user interface and configured to display requests for data unit information, receive from a user of the computing device, data unit information, and transmit the received data unit information to the server. The communication protocol may include at least one of a telephone call, a text message, a secured email, an mobile application, a direct message, and a social media platform. The server may be configured to apply one or more predefined rules stored on the database to the sensitive data to generate the data structure. The sensitive data may be generated by aggregating the received data units in accordance with the predefined rules. The request received from the user computing device may be by way of a graphical user interface generated by the server and displayed on the user computing device, and the graphical user interface may include a form.

In some embodiments, a method for improving the secured entry and storage of sensitive data may include the following steps: determining if a received request triggers a requirement to receive sensitive data; generating a data structure for the required sensitive data, wherein the data structure comprises a plurality of data units; designating a plurality of contact methods based on contact data, wherein each of the plurality of contact methods is configured to provide data unit information corresponding to a single data unit from among the generated plurality of data units; determining a communication protocol for each of the designated plurality of contact methods; transmitting, for each of the plurality of data units, a request for data unit information to the corresponding designated contact via the determined communication protocol; receiving, from each of the designated contacts, data unit information corresponding to their respective single data unit; and aggregating the received data unit information from each of the designated contacts to generate sensitive data.

Further, in the method, the step of transmitting the requests for data unit information may be performed concurrently and/or consecutively in accordance with the communication protocol. Further, the method may include the step of storing at least one of the received data unit information or generated sensitive data in a database in an encrypted format. Storing at least one of the received data unit information or generated sensitive data in the database in the encrypted format may include storing data in separate data structures. Further, the communication protocol may include at least one of a telephone call, a text message, a secured email, a mobile application, a direct message, and a social media platform. Further the step of generating the data structure for the required sensitive data may include applying one or more predefined rules to the sensitive data. Further, aggregating the received data unit information to generate sensitive data may include aggregating the received data unit information in accordance with the predefined rules.

In some embodiments, a method may include the steps of: generating, via a computing device, a request that triggers a requirement to receive sensitive data; transmitting, via the computing device, the generated request to a server system communicatively coupled to the computing device; receiving, via the computing device, one or more requests for data unit information, wherein each request corresponds to a subset of the sensitive data; completing, via the computing device, the request for each received request for data unit information; and transmitting, via the computing device, the completed requests to the server system, wherein receipt of the completed requests triggers a verification process on the server system. Further, the steps of receiving the one or more requests, and completing the requests may be facilitated by a user interface on the computing device.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
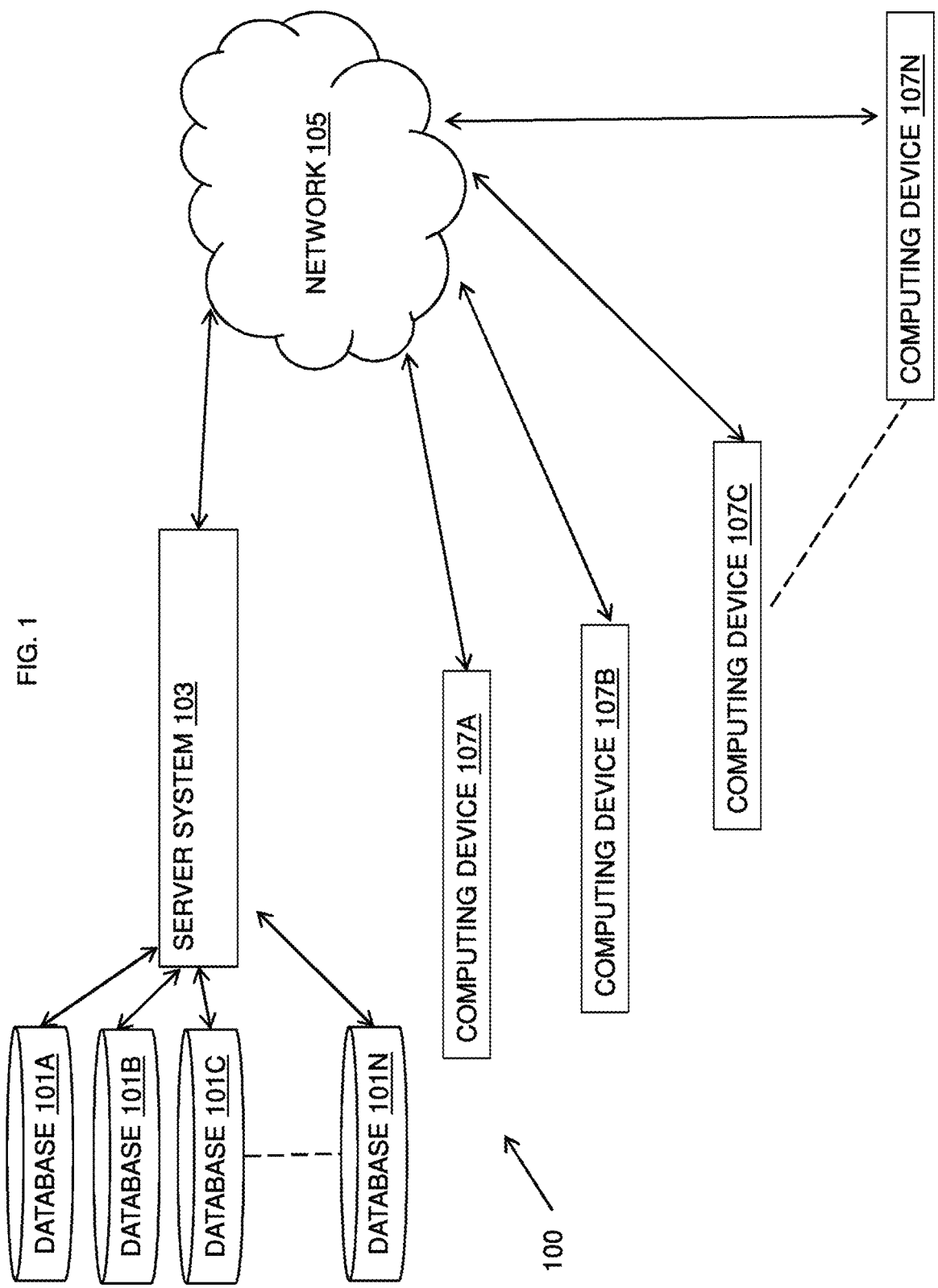
FIG. 1 illustrates a system for improved entry and storage of sensitive data in accordance with some embodiments of the present disclosure.

Embodiments of the present disclosure includes systems and methods for the improved entry and storage of sensitive data. Sensitive data may include personally identifying information, financial data, health data and the like. Examples of financial data include credit card numbers, debit card numbers, banking account numbers, routing numbers, balances, and the like. Examples of health data include prescription history, diagnostic tests, and the like. Examples of personally identifying information include social security numbers, addresses, phone numbers, date of birth, mother's maiden name, and the like. Sensitive data may include any data that is intended to be kept private or secured.

In some embodiments, the sensitive data may be requested on a form embodied on a graphical user interface (GUI) such as a website. Examples of common forms that request sensitive data include those associated with loan applications, mortgage applications, opening bank accounts, and the like. In some embodiments, the systems and methods described herein may be utilized in connection with such a form and GUI. For example, in some embodiments, when a user navigates to a field of a form that requires the input of sensitive data, the graphical user interface may generate a pop-up that may provide the user with a few options of how they want to be contacted. For example, the user may select that they want to provide a portion of the sensitive data via work-email, cell phone, call, text message, direct message, physical mail, and the like. In some embodiments, the user may be able to enter a portion of the sensitive data using the webpage or form. In some embodiments, the user's preferences may be pre-selected using a webpage or application that is preconfigured. The user may be contacted to provide portions of the sensitive data based on the contact methods that they specify. For example, a user may receive a text asking them to enter the second two digits of their social security number, an automated phone call asking them to enter the first three digits of their social security number, and a secured email asking them to enter the last four digits of their social security number. In some embodiments, how the sensitive data is parsed into separate data units (e.g., first three digits, second two digits, last four digits) may be determined by the server system. In some embodiments, a portion of the sensitive data may be entered via the online form. For example, for a social security number, the form may be configured to receive the first three digits from the user of the form using the webpage, and use other alternative contact methods for the remaining data units.

The systems and methods may be integrated into a conventional system for generating and processing forms, embodied as a plug-in browser application, and the like.

In some embodiments, systems and methods of the present disclosure may include a front end component (e.g., user interface) that is configured to allow a user to select options for communication and/or to provide a portion of the sensitive data. The data received by the front end component may be transmitted to a frontend server that is communicatively coupled to a backend server. In some embodiments, the backend server may be configured to lookup contact methods (e.g., when contact methods had been pre-specified but not entered on the frontend component) and initiate one more requests for sensitive data based on the contact methods.

FIG. 1 illustrates a system 100 for improved entry and storage of sensitive data in accordance with some embodiments of the present disclosure. As illustrated, a system 100 may include a server system 103 communicatively coupled to a plurality of computing devices 107A to 107N (collectively, 107) via network 105. Further, a plurality of database structures 101A to 101N (collectively, 101) may also be communicatively coupled to the server system 103. In some embodiments, if a plurality of database structures are used, the server system 103 may include a data aggregator configured to aggregate data stored across a plurality of databases. Alternatively, in some embodiments, a single database, 101, may be used. In some embodiments, server system 103 incudes one or more frontend and backend servers.

In some embodiments, network 105 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

In some embodiments, the computing devices 107 may include a desktop, laptop, cell phone, smartphone, tablet, and the like. In some embodiments, a user may use one of the computing devices 107 to access a webpage, portal, form, or other application generated by the server system 103 via a user interface on the computing device 107. In some embodiments, the form, webpage, portal, or other application provided via the user interface on the computing device 107 may prompt the user to enter data that may be considered sensitive data. For example, the user may submit a request to elect to open a bank account, submit a mortgage application, or fill out a lease, and be prompted to enter sensitive data such as a social security number. The request received from the user via the computing device 107 may be transmitted to the server system 103. Upon receipt of the request, the server system 103 may determine whether the received request would trigger a requirement to receive sensitive data. In some embodiments, the request received from the user computing device is via a graphical user interface generated by the server and displayed on the user computing device, and the graphical user interface includes a form.

For example, in some embodiments, a user may navigate to a webpage that includes a form with one or more fields. As the user hovers above a field that requests sensitive data, or after a user clicks on a button on the webpage, the user may be provided with a popup. The popup or a portion of the webpage may explain to the user that sensitive data is being requested, and that the sensitive data may be entered in portions. The user may then be prompted to provide a portion of the sensitive data and/or contact methods for providing the remainder of the sensitive data.

In some embodiments, if the received request triggers a requirement to receive sensitive data, for example, if a loan application requires the submission of a social security number, the server system 103 may be configured to provide an alternate, tokenized improved system and method for securely entering and storing the sensitive data. In some embodiments, a user may be able to use at least part of the website or user interface to enter a portion of the sensitive data, initially, while the remaining portions may be entered by the contact methods. In some embodiments, the server system 103 may be configured to generate a data structure for the sensitive data that includes one or more data units. Data corresponding to each individual data unit may then be separately requested from a user. The generated data structure may be based on a set of predetermined rules that may be stored, for example, in the database 101. The predetermined rules may help determine the length of each data unit, and/or how many data units the sensitive data should be represented as. In some embodiments, the length of each data unit and/or how many data units may be determined using a random number generator. In some embodiments, the length of data unit and/or how many data units may be determined in accordance with conventional practice (e.g., 3 data units having 2 numbers each for dates; 4 data units having 4 digits each for credit cards; 3 data units having 3, 2, and 4 digits each, respectively, for social security numbers). Alternative methods for determining the predetermined rules may be used.

In some embodiments, the server system 103 may be configured to designate a plurality of contact methods, and each individual data unit may be associated with a different contact method. The contact methods may be determined by contact data stored on the database 101 communicatively coupled to the server system 103. In some embodiments, the contact data may be provided to the database 101 via the user interface. In some embodiments, the user may designate one or more contact methods. In some embodiments, the contact data may further specify that certain contact methods are more or less preferred at different days, times, and the like. Further, the user may designate the contact methods prior to submitting a request to the server system 103 that triggers a requirement to receive sensitive data. For example, the user may designate the contact methods and provide contact data using the user interface of the computing device 107 such as when the user opens or registers an online bank account. Alternatively or additionally, in some embodiments, the user may provide contact data (including contact methods) after navigating to a user interface and providing a portion of the sensitive data. For example, a user may be prompted to provide two contact methods after entering data corresponding to a data unit related to the first portion of a social security number.

In some embodiments, one or more contact methods may be associated with a computing device, and a plurality of computing devices may be associated with a single user. For example, a cell phone may be used for both sending a text corresponding to a first data unit and receiving and entering information via an automated phone call corresponding to a second data unit.

In some embodiments, the server system 103 may be configured to determine a communication protocol for each of the designated plurality of contact methods. Example communication protocols may include telephone calls, text messages, secured emails, emails, mobile applications, direct messaging, and social media platforms. Examples may include work email, personal email, secured email form, cell phone numbers, text messaging platforms, mobile applications, direct messaging on social media applications (i.e., Facebook®, Twitter®) and the like.

After determining a communication protocol for each of the designated contact methods (and respective data unit), the server system 103 may then transmit, for each of the plurality of data units, a request for data unit information to the corresponding designated contact method via the determined communication protocol. In some embodiments, the requests for data unit information may be transmitted concurrently in accordance with the communication protocol. Alternatively, in some embodiments, the requests for data unit information may be transmitted consecutively in accordance with the communication protocol. In some embodiments, each successive data unit of the sensitive data may be requested consecutively. For example, once data unit information for a first data unit is received, data unit information for a second data unit may be requested.

The requests for data unit information may be received by each designated contact method on a computing device 107 with at least one user interface. In particular, the user interfaces may be configured to display and/or provide the requests for data unit information, receive from the user of the computing device data unit information corresponding to the request, and transmit the received data unit information to the server 103. For example, the user interface may include a mobile application, text message, or automated phone call.

In some embodiments, the requests for data unit information may be obfuscated to a non-user of the system. For example, text messages requesting data for the data unit corresponding to the middle two digits of your social security number may ask a user to enter the two digits they promised to provide, or ask a user for the initials corresponding to their state. In some embodiments, the user may elect how they want their communications to be obfuscated when providing the database with contact data. Further, in some embodiments, the requests for data unit information may be encrypted.

The server system 103 may be further configured to receive from each of the designated contact methods, data unit information corresponding to a respective single data unit. The server system 103 may then generate sensitive data by aggregating the received data unit information received from each of the designated contacts. The aggregation of the received data unit information may be in accordance with one of the predefined rules. For example, the rules may specify the order in which the received data units should be aggregated.

In some embodiments, the server system 103 may be further configured to store the received data unit information or generated sensitive data (the aggregated data unit information) in the database 101 in an encrypted format. In some embodiments the received data units corresponding to a single piece of sensitive data may be stored in separate data structures. In some embodiments, each data unit may be encrypted prior to storage and may need to be decrypted prior to being aggregated.

In some embodiments, the server system 103 may interface with one or more application interfaces on a computing device 107 in order to transmit and receive information (e.g., data unit information, requests for sensitive data) from the user.

In some embodiments, once the server system 103 receives all of the data units corresponding to the sensitive data, and generates the sensitive data by aggregating all of the received data units, the process that triggered the request for sensitive data may continue. For example, in a loan application, banking form, credit card form, or the like, the webpage may move onto the next step of the application or procedure. In some embodiments, the webpage may move onto the next step of the application or procedure, before all of the sensitive data is received. However, in such an embodiment, the application and/or procedure may not be submitted or completed until all of the sensitive data was received and/or aggregated.

Figure 2:
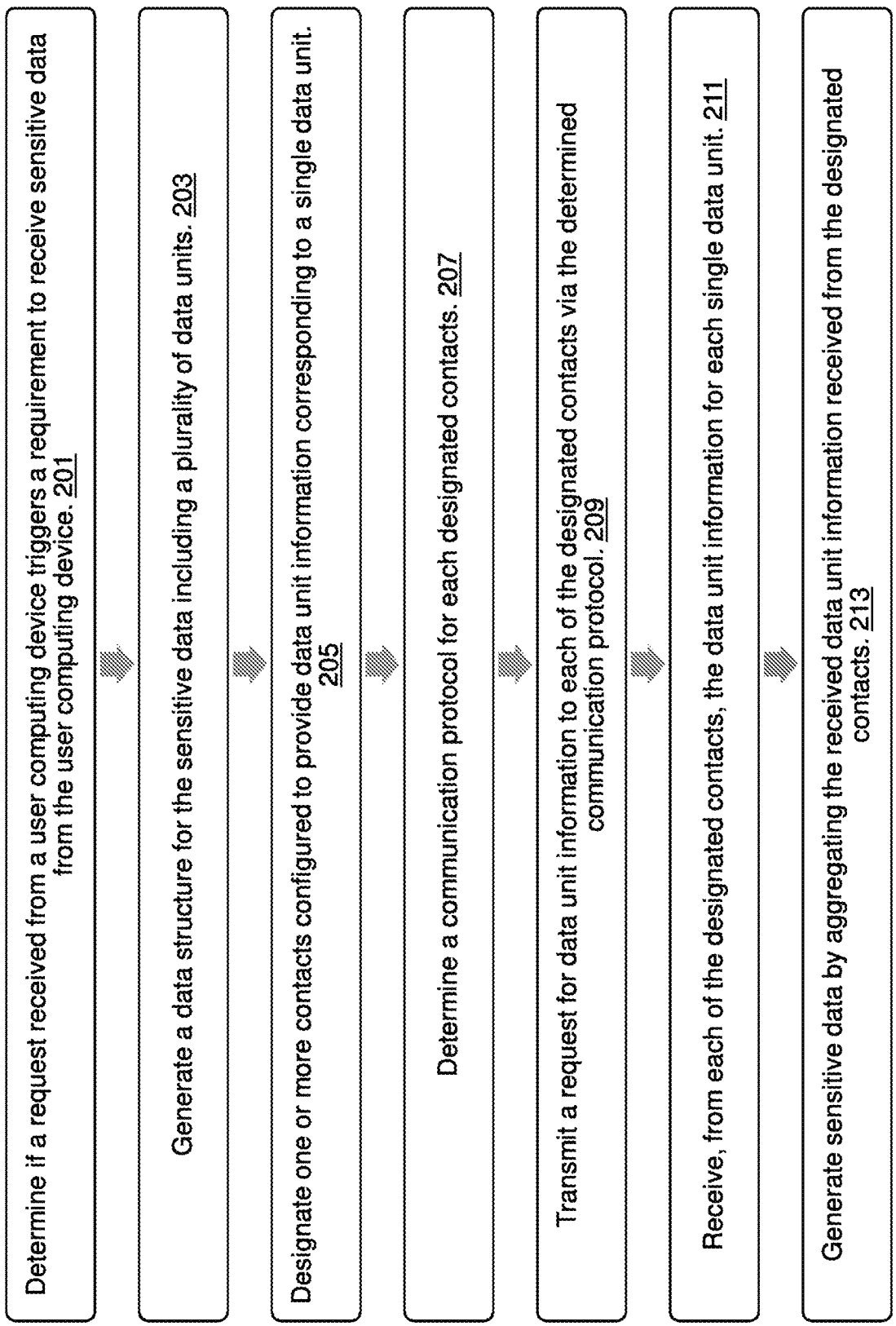
FIG. 2 illustrates a method for improved entry and storage of sensitive data in accordance with some embodiments of the present disclosure.

FIG. 2 illustrates a process for improving the secured entry and storage of sensitive data. In a first step 201, a server system such as server system 103 may determine if a received request triggers a requirement to receive sensitive data. In a second step 203, a server system may generate a data structure for the required sensitive data. In some embodiments, the data structure may include a plurality of data units, each corresponding to a portion of the sensitive data. In a third step 205, the server system may designate a plurality of contact methods based on contact data. Each of the plurality of contact methods may be configured to provide data unit information corresponding to a single data unit from among the generated plurality of data units. In a fourth step 207, the server system may determine a communication protocol for each of the designated plurality of contact methods. In a fifth step 209, the server system may transmit, for each of the plurality of data units, a request for data unit information to the corresponding designated contact via the determined communication protocol. For example, the requests for data unit information may be transmitted concurrently or consecutively. In a sixth step 211, the server system may receive, from each of the designated contacts, data unit information corresponding to their respective single data unit. In a seventh step 213, the server system may aggregate the received data unit information from each of the designated contacts to generate sensitive data. In some embodiments this may be done in accordance with predefined rules.

In some embodiments, the received data unit information or generated sensitive data may be stored in a database in an encrypted format. This may include storing the sensitive data in separate data structures. In some embodiments, the processes illustrated in FIG. 2 may be implemented by one or more components of the computer architecture depicted in FIG. 1.

Figure 3:
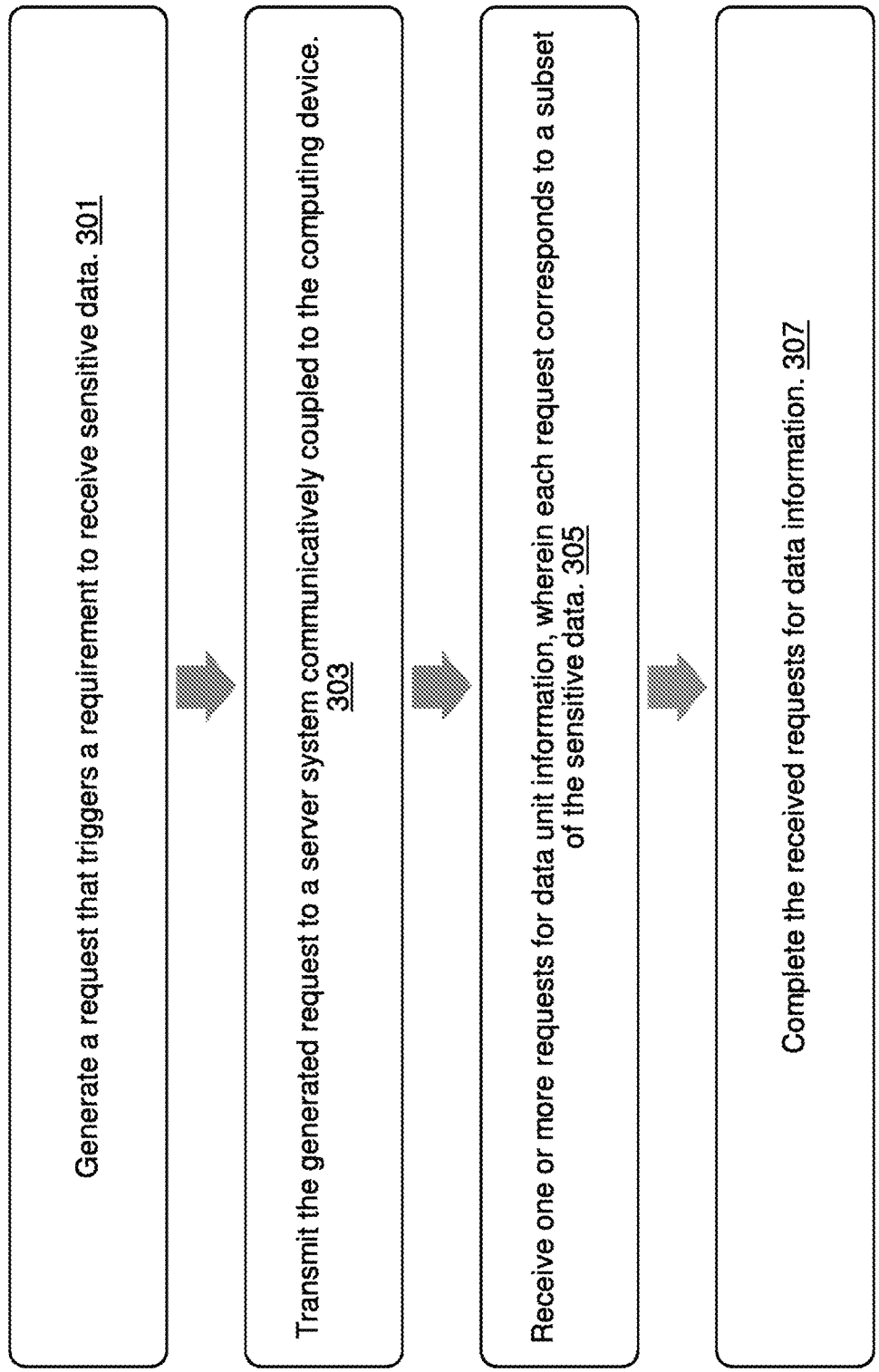
FIG. 3 illustrates a method for improved entry and storage of sensitive data in accordance with some embodiments of the present disclosure.

FIG. 3 illustrates a process implemented by a computing device such as 107 communicatively coupled to the server system such as 103. As illustrated in FIG. 3, in a first step 301, the computing device may generate a request that triggers a requirement to receive sensitive data. In a second step 303, the computing device may transmit the generated request to the server system. In a third step 305, the computing device may receive one or more requests for data unit information. Each request may correspond to a subset of the sensitive data. In a fourth step 307, the computing device may complete the request for each received request of data unit information. In a fifth step 309, the computing device may transmit the completed requests to the server system. Receipt of the completed requests triggers a verification process on the server system. Any and/or all of the steps illustrated in the process of FIG. 3 may be facilitated by a user interface of the computing device communicatively coupled to the server system. In some embodiments, the processes illustrated in FIG. 3 may be implemented by one or more components of the computer architecture depicted in FIG. 1.

Figure 4:
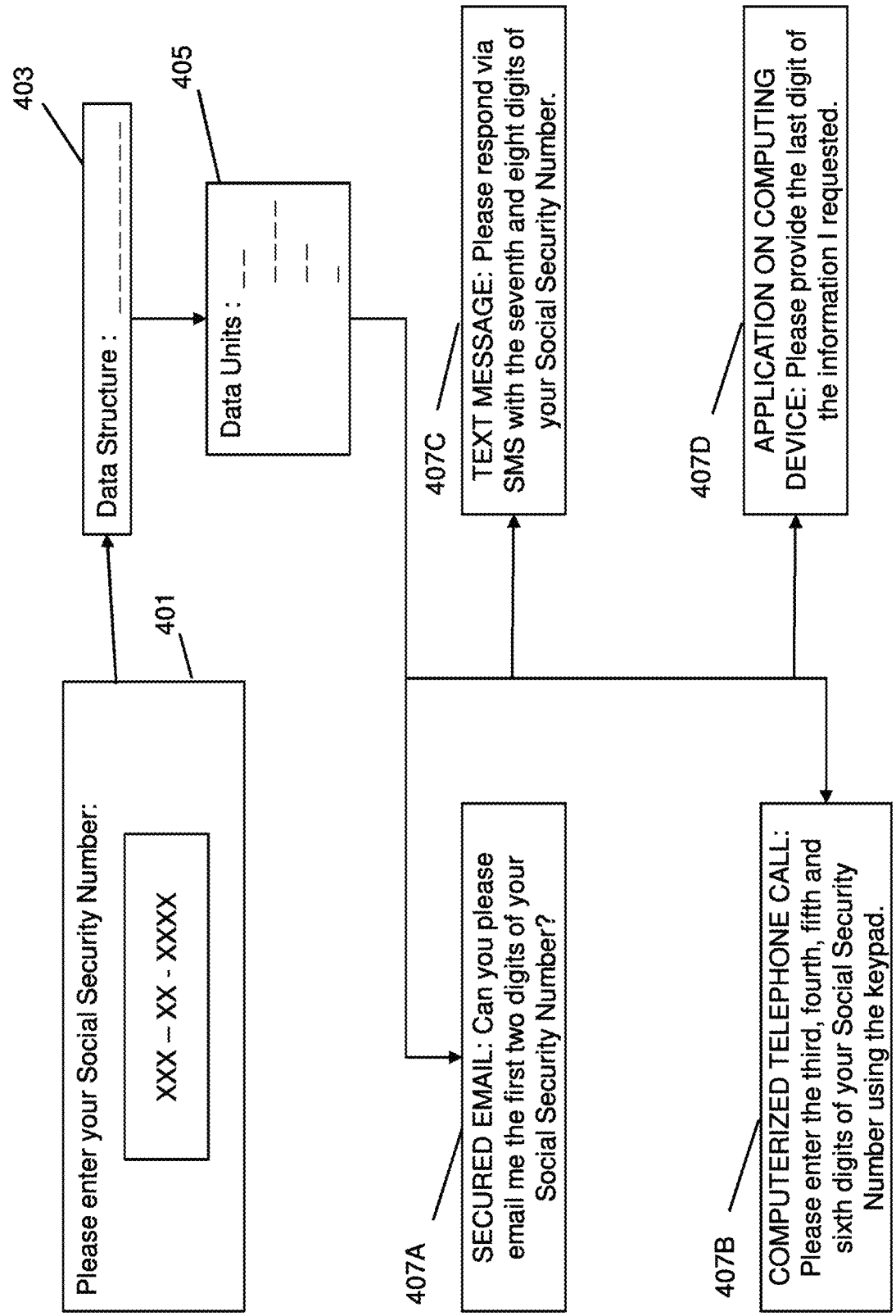
FIG. 4 illustrates an example schematic for improved entry and storage in accordance with some embodiments of the present disclosure.

FIG. 4 illustrates an example schematic for improved entry and storage in accordance with some embodiments of the present disclosure. As depicted, a user interface of a user computing device may request that a user enter sensitive data such as a social security number 401. Upon trying to submit the social security number, the user computing device (such as computing device 107) may transmit a request requiring the receipt sensitive data to the server system (not shown). The server system may then generate a data structure that is capable of representing the sensitive data 403. For example, a data structure for a social security number may be represented as nine consecutive digits. Further, the data structure may include a plurality of data units 405. For example, a social security number can be represented as a sequence of four data units each having two, four, two, and one digit, respectively. As illustrated in FIG. 4, a contact method may be designated for each data unit. For example, contact methods may include secured email 407A, computerized telephone calls 407B, text message 407C, and an application on a computing device 407D.

Figure 5:
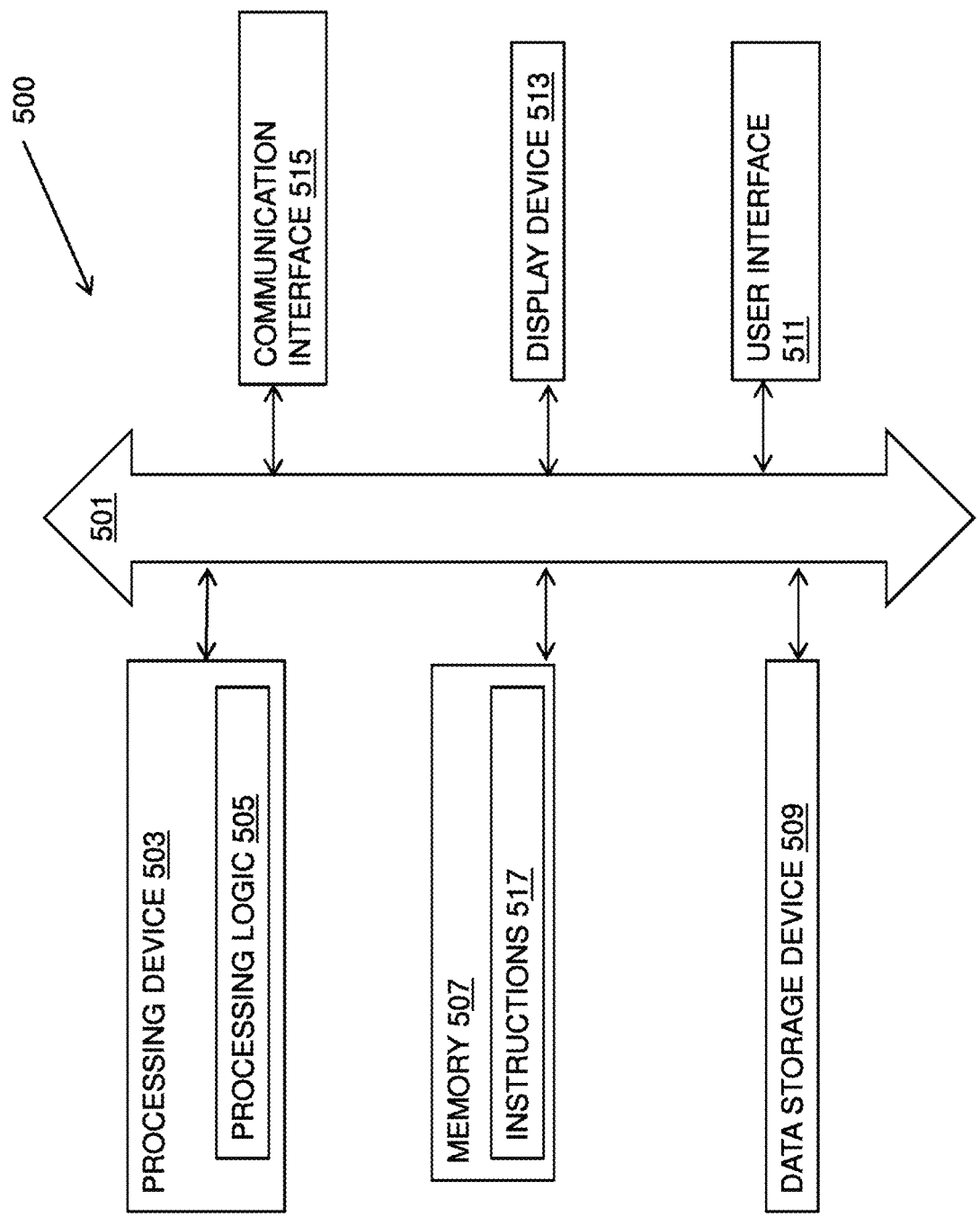
FIG. 5 illustrates a computer system in accordance with some embodiments of the present disclosure.

FIG. 5 illustrates a computer system in accordance with some embodiments of the present disclosure.

FIG. 5 illustrates a functional block diagram of a machine in the example form of computer system 500, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the user computing device 101 and the server system 105 of FIG. 1 may be implemented by the example machine shown in FIG. 5 (or a combination of two or more of such machines).

Example computer system 500 may include processing device 503, memory 507, data storage device 509 and communication interface 515, which may communicate with each other via data and control bus 501. In some examples, computer system 500 may also include display device 513 and/or user interface 511.

Processing device 503 may include, without being limited to, a microprocessor, a central processing unit, an application specific integrated circuit (ASIC), a field programmable gate array (FPGA), a digital signal processor (DSP) and/or a network processor. Processing device 503 may be configured to execute processing logic 505 for performing the operations described herein. In general, processing device 503 may include any suitable special-purpose processing device specially programmed with processing logic 505 to perform the operations described herein.

Memory 507 may include, for example, without being limited to, at least one of a read-only memory (ROM), a random access memory (RAM), a flash memory, a dynamic RAM (DRAM) and a static RAM (SRAM), storing computer-readable instructions 517 executable by processing device 503. In general, memory 507 may include any suitable non-transitory computer readable storage medium storing computer-readable instructions 517 executable by processing device 503 for performing the operations described herein. Although one memory device 507 is illustrated in FIG. 5, in some examples, computer system 500 may include two or more memory devices (e.g., dynamic memory and static memory).

Computer system 500 may include communication interface device 511, for direct communication with other computers (including wired and/or wireless communication), and/or for communication with network 105 (see FIG. 1). In some examples, computer system 500 may include display device 513 (e.g., a liquid crystal display (LCD), a touch sensitive display, etc.). In some examples, computer system 500 may include user interface 511 (e.g., an alphanumeric input device, a cursor control device, etc.).

In some examples, computer system 500 may include data storage device 509 storing instructions (e.g., software) for performing any one or more of the functions described herein. Data storage device 509 may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, soft ware, Software applications or code) include machine instructions for a programmable processor, and may be implemented in a high-level procedural and/or object-oriented programming language, and/or in assembly/machine language. As used herein, the terms "machine-readable medium' "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, much of this document has been described with respect to television advertisements, but other forms of future, viewership-based advertisements may also be addressed. Such as radio advertisements and on-line video advertisements. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The invention claimed is:

1. An improved user interface for the secured entry and display of sensitive data comprising:
   a web-based application for display on a user computer device, wherein the web-based application is configured to:
   receive user requests for a verification process;
   determine whether the user request requires the entry of sensitive data by transmitting the user request to a server system communicatively coupled to the user computer device, wherein the server system generates a data structure for sensitive data responsive to determining that the user request requires entry of sensitive data, wherein the data structure comprises a plurality of data units, wherein at least one of the size and the quantity of the data units is determined by the server based on predetermined rules stored on a database communicatively coupled to the server system, wherein the server system designates a contact method for each of the plurality of data units;
   updates the web-based application to display requests for data unit information for a subset of the plurality of data units;
   receive from a user of the computing device, data unit information corresponding to the displayed requests for data unit information; and
   transmit the received data unit information to the server; and
   initiate the verification process upon receipt of an approval from the server.

2. The user interface of claim 1, wherein sensitive data comprises at least one of health data, financial data, and personally identifying data.

3. The user interface of claim 1, comprises a form.

4. The user interface of claim 1, wherein the web-based application is updated to receive user entry of contact data for each data unit in the plurality of data units.

5. The user interface of claim 1, wherein the web-based application is updated to receive user entry of a communication protocol for each data unit in the plurality of data units.

6. The user interface of claim 5, wherein the communication protocol comprises at least one of a telephone call, a text message, an secured email, an mobile application, a direct message, a rendered web form, and a social media platform.

7. The user interface of claim 1, wherein the received data unit information is transmitted to the server in an encrypted format.

8. The user interface of claim 1, wherein the verification process comprises at least one of a loan application, banking form, and credit card form.

9. The user interface of claim 1, wherein the request for data unit information obfuscates the type of sensitive data.

10. The user interface of claim 1, wherein the user interface receives approval from the server responsive to the server generating sensitive data by aggregating the data unit information received from the web-based application and with data unit information received from other communication protocols.

11. A method for improved secured entry and display of sensitive data comprising:
   displaying a web-based application on a user computer device, wherein the web-based application is configured to enable a verification process;
   receiving user requests, from a user of the user computer device, for the verification process;
   determining whether the user request requires the entry of sensitive data by transmitting the user request to a server system communicatively coupled to the user computer device, wherein the server system generates a data structure for sensitive data responsive to determining that the user request requires entry of sensitive data, wherein the data structure comprises a plurality of data units, wherein at least one of the size and the quantity of the data units is determined by the server based on predetermined rules stored on a database communicatively coupled to the server system, wherein the server system designates a contact method for each of the plurality of data units;
   updating the web-based application to display requests for data unit information for a subset of the plurality of data units;
   receiving from a user of the computing device, data unit information corresponding to the displayed requests for data unit information; and
   transmitting the received data unit information to the server; and
   initiating the verification process upon receipt of an approval from the server.

12. The method of claim 11, wherein sensitive data comprises at least one of health data, financial data, and personally identifying data.

13. The method of claim 11, wherein the web-based application comprises a form.

14. The method of claim 11, comprising:
updating the web-based application to receive user entry of contact data for each data unit in the plurality of data units.

15. The method of claim 11, comprising:
updating the web-based application to receive user entry of a communication protocol for each data unit in the plurality of data units.

16. The method of claim 11, wherein the communication protocol comprises at least one of a telephone call, a text message, an secured email, an mobile application, a direct message, a rendered web form, and a social media platform.

17. The method of claim 11, comprising:
transmitting the received data unit information from the user interface to the server in an encrypted format.

18. The method of claim 11, wherein the verification process comprises at least one of a loan application, banking form, and credit card form.

19. The method of claim 11, wherein the request for data unit information obfuscates the type of sensitive data.

20. The method of claim 11, wherein initiating the verification process upon receipt of an approval from the server further comprises:
receiving approval from the server responsive to the server generating sensitive data by aggregating the data unit information received from the web-based application and with data unit information received from other communication protocols.

* * * * *